United States Patent
I'Anson

[15] 3,673,794
[45] July 4, 1972

[54] INDUSTRIAL CHAIN AND METHOD OF MANUFACTURING SAME

[72] Inventor: Thomas I'Anson, 4014 Hunts Point Road, Bellevue, Wash. 98004

[22] Filed: Dec. 16, 1970

[21] Appl. No.: 98,661

[52] U.S. Cl. ..........................................59/35, 59/8, 59/84, 59/90, 74/250 R
[51] Int. Cl. .....................................B21l 11/00, F16g 13/18
[58] Field of Search...........................59/8, 5, 35, 78, 84, 90; 74/250 R, 250 C, 251 R, 251 C, 255 R; 198/189

[56] References Cited

UNITED STATES PATENTS

| 912,982 | 2/1909 | Dodge | 59/8 |
| 1,139,019 | 5/1915 | Dodge | 59/8 |
| 2,655,816 | 10/1953 | Riopelle | 74/251 R |
| 3,125,850 | 3/1964 | Onulak | 59/8 |
| 3,192,785 | 7/1965 | Pearson | 59/8 |

Primary Examiner—Charles W. Lanham
Assistant Examiner—Gene P. Crosby
Attorney—Christensen & Sanborn

[57] ABSTRACT

A chain construction is disclosed wherein the individual links are cast in a one-piece unit including side bars, and transverse pivotal connecting elements, one of which in the H-type chain disclosed comprises a shaft and the other a shaft journal sleeve element interconnecting the side bars at the respective opposite ends thereof. The connecting sleeve portion of a link is preformed with an open-sided configuration bendable into closed encirclement around the adjoining link's pivot shaft and the slit edges are welded shut at the sides of the link. A Teflon antifriction bearing pad retained in a wall pocket in the sleeve formation is also disclosed.

15 Claims, 5 Drawing Figures

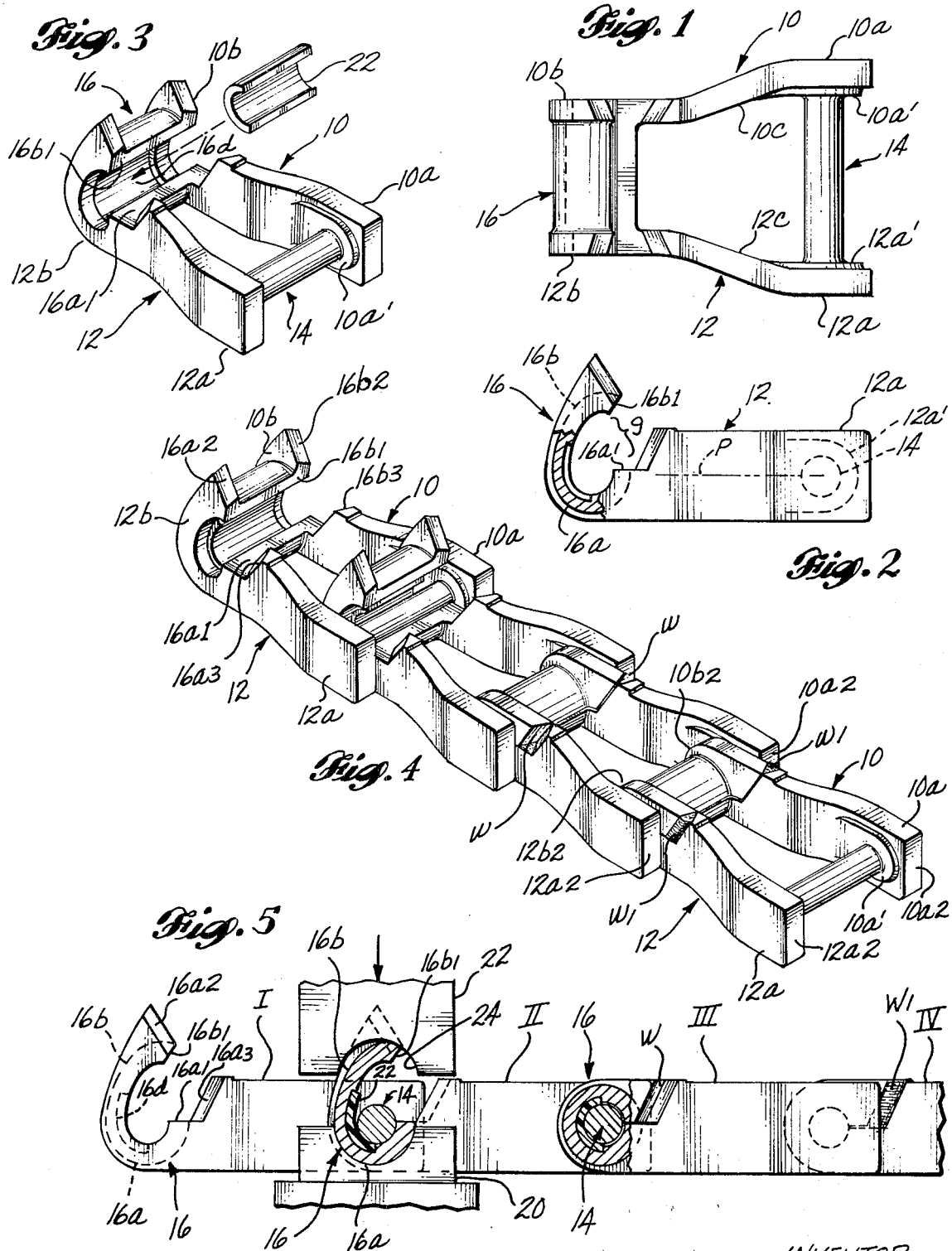

INDUSTRIAL CHAIN AND METHOD OF MANUFACTURING SAME

DESCRIPTION

Conventional heavy-duty industrial chains, including those of the H-type, such as are used in conveyor systems and drive mechanisms in forest product mills and other industrial plants, are commonly manufactured with the side bars and transverse bearing sleeve elements cast in one piece and with the pivot shaft constituted as a rivet designed to pass through apertures in the opposite ends of the side bars and through the aligned bearing sleeve of the adjoining link accommodated between such side bars. As another example, with conventionally manufactured C-type industrial chains alternate links comprise side bars interconnected at both ends by rivet shafts designed to pass through sets of apertures in the respective bar ends. In either form of chain the protruding plain end of the rivet shaft is headed so as to lock the parts together. In practice it is found that the rivet shafts in these chains tend to slip and work in the side bar apertures. This causes the apertures to elongate progressively as the chain is used and thereby causes an increase in the pitch distance of the chain and weakens the chain over a period of time so as to shorten its useful life.

The rate of such elongative wear in the link bar rivet shaft apertures can be reduced by thickening of the bar and/or increasing the rivet shaft diameter, but with a chain of given size this is not always possible because of dimensional limitations imposed by functional and spacing requirements and also it does add to the cost of the chain by increasing the amount of material required in the side bars and/or the rivet shafts.

Alternatively special manufacturing techniques can be used to reduce the described wear factor, but these also tend to increase the initial cost of the chain and for many applications prohibitively so. One such special manufacturing technique is to employ precision casting methods or machining methods which are controlled so as to maintain very close dimensional tolerances such that the rivet shafts engage the side bar apertures with a tight press fit precluding relative motion between these elements during operation of the chain. Another technique is to use special materials which as slippage occurs under load pressures will work harden at the interfaces between the rivet shaft surface and the side bar aperture wall surfaces, but when materials of this nature are used, other desirable properties for the material used in such chains are sacrificed. Consequently, economic and practical factors have deterred manufacturers from using them or they have not always been satisfactory solutions to the problem.

As a result, conventional practices in the manufacture of heavy-duty industrial chains using prior chain designs and prior methods of manufacture for most applications have involved numerous compromises attempting to balance economic and functional factors.

An object of the present invention is to provide improved low-cost industrial chains and method of manufacturing the same.

A further object is to provide an improved method of manufacturing industrial chains, greatly reducing the problem of wear between the working surfaces of the chained links.

A related object is to eliminate the use of separate rivet shafts in the formation and assembly of the links.

A more specific object is to devise long-life industrial chains which may be made of metals chosen for optimal properties in the functioning of heavy-duty chains without compromising in the choice of these materials for the sake of reducing chain wear. A correlative object is to devise long-life industrial chains without necessity of expensive manufacturing procedures such as those described and without materially increasing, if indeed increasing at all, the cost of ordinary industrial chain for general applications.

A further object hereof is to devise an improved, low-cost method of manufacturing industrial chains using a combination of foundry casting, shop bending, and simple welding procedures which can produce normally dimensioned, heavy-duty industrial chains as strong as or stronger than conventional chains and having a much longer useful life than the conventional chains.

A further object directed to a specific optional feature of the invention is to devise a relatively low-friction, readily flexible industrial chain having excellent wear resistance utilizing an inexpensive means of incorporating Teflon (polytetrafluoroethylene) or other suitable antifriction wear pad material incorporated in the link connecting sleeves preliminary to and in the process of assembling the links into a chain, thereby further to improve the operating and life characteristics of such chains.

In achieving the above and related objectives, such as in an H-type or C-type chain, all links are essentially of one-piece construction in which the transverse shaft elements are cast integrally with the link side bars, further the transverse sleeve-forming elements are also cast integrally with the side bars. Thus in an H-type chain as disclosed each link comprises side bars and a transverse sleeve element and transverse shaft element at the respective ends of the bars and formed integrally therewith. In a C-type chain alternate links have two transverse shafts at the respective side bars and formed integrally therewith, whereas the intervening links have two sleeve-forming elements at the respective ends of their side bars and formed integrally with them. In each instance the sleeve element is of open-sided construction initially, that is, is slitted, and is formable by bending it from an open configuration into a circular closed configuration as a journal around the shaft of an adjoining link, which shaft during chain assembly is inserted transversely of its length into the sleeve formation through the slit thereof preliminary to the bending operation. Thus, in the assembled condition of a chain of any type incorporating this invention the only link element bearing surfaces subjected to relative motion during chain flexure are surfaces that can be made of relatively large area, namely, the working side of the elongated sleeve element bore wall and that of the elongated shaft element encircled thereby. Consequently any wear-producing load forces are spread over a large area and wear is thereby minimized.

As a further feature of the invention, with the precast one-piece chain links thus assembled and the sleeve elements bent closed around the shaft elements which they encircle, they are welded permanently shut by short welds placed at readily accessible locations at the respective sides of the links. Tests demonstrate that such chains will withstand loads as high as or higher than conventional chains of the same physical shape, material and dimensions despite the minimal weld materials used, and that when breakage does occur in the improved chains, it typically occurs at points other than the weld points.

As an additional feature, the sleeve bore wall may have a shallow pocket therein which accommodates an insertable bearing pad of Teflon or other suitable material serving as an antifriction, wear-resistant pad in bearing contact with the shaft of the adjoining link encompassed by the sleeve.

These and other features, objects, and advantages of the invention will become more fully evident from the following description thereof by reference to the accompanying drawings wherein the invention is illustratively applied to an H-type chain.

FIG. 1 is a top view of the cast chain link in the preferred embodiment in an H-type chain;

FIG. 2 is a side view of the improved chain link;

FIG. 3 is an isometric view of the chain link and an antifriction bearing pad ready for insertion in the retainer pocket of the sleeve portion thereof;

FIG. 4 is an isometric view of a chain partially assembled employing such links;

FIG. 5 is an edge view of the partially assembled chain in process of receiving additional links and illustrating a means by which to bend such links into position.

Referring to the drawings, the improved link in the illustrated H-chain configuration is cast in one piece of suitable industrial chain material such as 12 percent manganese steel. It comprises side bars 10 and 12 of generally rectangular cross-section. The bars have transversely offset opposite end portions 10a, 10b and 12a, 12b, respectively, formed such that the inner faces of ends 10a and 12a are spaced apart more widely than the outer faces of ends 10b and 12b. The ends 10a and 12a are transversely interconnected by a round shaft 14. The inside faces of the bar ends 10a and 12a where joined by the ends of a shaft 14 are shimmed inward by boss or step formations 10a' and 12a' with flat mutually parallel inside faces only slightly exceeding the distance between the outer faces 10b and 12b so as to accommodate the similar ends of an adjacent link between them.

Formed integrally with the bar ends 10b and 12b, the link further comprises the transversely extending bearing sleeve formation 16 transversely interconnecting and including the adjacent ends of the bars. In its initial unbent form, that is in the configuration in which it emerges from the casting die or mold, the sleeve formation 16 comprises a semicylindrical (half-tubular) base portion 16a of circular curvature and an arcuately curved cover portion 16b which extends from one edge of the base portion 16a and itself has a free edge 16b1 which is separated by a gap g from the opposite edge 16a1 preferably lies in the chain link's longitudinal mid-plane P containing the axis of shaft 14. The gap g has sufficient width to permit insertion of an adjacent chain link's shaft 14 for interconnection therewith during assembly of the chain as will be evident in the description which follows. The arcuate length of the projecting cover portion 16b is such and its configuration is such as to permit bending of the cover portion 16b around a shaft 14 seated in base portion 16a so as to close gap g and thereby form a substantially complete journalling circular enclosure around such shaft over substantially its full length.

Preferably the faces 12a2 and 10a2 at the ends of the bars joined by shaft 14 are generally flat and disposed at right angles to the longitudinal extent of the respective bars. The opposite ends of the bars have circularly convex edges 10b2 and 12b2 as best shown in FIG. 4. These circularly convex ends provide link clearance during flexing of a chain of such links despite close proximity of such ends of each link to the angled mid-portions 10c and 12c of the bars of the adjacent link.

It will also be seen that the width of the bars measured transversely to the link's longitudinal mid-plane P somewhat exceeds the outside diameter of the formed tubular bearing sleeve 16. Moreover, the sleeve formation slit edges 16a1 and 16b1 extend continuously across the link bars to the lateral outer side faces of the link. Thus the link bar ends 10b and 12b are themselves included in and comprise part of the sleeve formation 16, although in the example serve as flanged ends thereof. The terminal portions of edge faces 16a1 and 16b1 which cross over the bar ends 10b and 12b extend radially from the axis of the sleeve and then angle obliquely outward to the bar edges by way of the angled sets of faces 16b2, 16b3 and 16a2, 16a3, the mates of which abut each other in the final bent chain-assembled configuration of the bearing sleeve. The edges 16b2 and 16b3 are beveled in relation to each other, as are the edges 16a2 and 16a3 so as to form outwardly facing reentrant pockets W which are easily accessible and clear of ends 10a2 and 12a2 for deposit of weld material W1 in completing the chain as depicted in FIG. 4. It is unnecessary to extend the weld throughout any other portion of the slit edges in completing a chain of such links.

In FIG. 5 link I has been positioned with its bearing shaft 14 inserted in the base portion of the sleeve formation 16 of link II with the latter lying supported in the semicircular recess of a stationary base die 20. In the drawing, an opposing complemental presser die 22 having a semicylindrical recess 24 in the lower face thereof and of a width to be accommodated between the side bars 10 is about to be pressed downward (in the direction of the arrow) and thereby to bend the cover portion 16b downward and into closed circle-completing configuration surrounding the shaft 14. By having the curvature (before bending) of the cover portion 16b gradually decrease in radius approaching its free edge 16b1, and by having this curvature immediately adjoining such edge substantially circular of the intended final radius, bending of the sleeve into its final circle-completing configuration by means of the die elements 22 and 20 is effected with comparative ease. In FIG. 5 such bending has been shown completed in the case of the sleeve portion 16 of link III surrounding the shaft 14 of link II. The resultant weld pockets W are then formed on both sides of the chain, preparatory to welding of the ends shut. In the right-hand portion of FIG. 5 the weld material W1 connects together the assembled links IV and III. Manufacturing of a chain in the step-by-step sequence as depicted in FIG. 5 is readily possible, or obviously an entire chain may be assembled through the bending phase only, whereupon the welding of all kinds may be done at a later time.

As a further feature of the preferred embodiment disclosed, the sleeve formation 16 has a shallow pocket 16b extending across the major portion of the length (transverse to the link) of its interior face and occupying approximately 180° of its arcuate extent, half of the pocket lying above and half below mid-plane P. Greater arcuate length is unnecessary and would only increase the proximity of any organic bearing pad material to be received in the pocket to the elevated metal temperatures near the weld pockets W during deposit of weld material W1. Preferably, the side edges of the pocket 16b are parallel to each other and the end edges of the pocket are parallel to each other and of radial extent such that a thin rectangularly formed piece of polytetrafluoroethylene (Teflon) 22 inserted in the pocket will be retained therein tensionally until the sleeve is closed around a link shaft 14. Such material will then serve as an antifriction bearing pad which distributes the load over most of the working side of the bearing shaft of the adjacent link and provides a low-friction interface to facilitate chain flexure. Other materials may also be used in lieu of or in addition to that specifically mentioned.

It will be seen that the features of this invention have been specifically illustrated and described in connection with a particular kind and shape of industrial chain and by reference to particular materials that are preferred therein; however, it will be evident that the concepts representing the invention may be otherwise embodied to advantage and that the disclosed embodiment is therefore not intended to be limiting.

I claim:

1. An industrial chain comprising a series of interconnected links each of integral one-piece construction including a pair of longitudinal link bars integrally cast with and joined by transverse pivotal link-connecting elements at the respective ends of the bars, one such element of one link comprising a transverse shaft and one such element of an adjoining link comprising a transverse shaft journal sleeve formation encircling such shaft to permit relative rotational movement therebetween, said sleeve formation being slitted throughout its length and bent closed around said shaft with the slit edges brought together and welded shut at respectively opposite end portions thereof.

2. The chain defined in claim 1, wherein the sleeve formation wall slit in the region between the side bars of the link joined by such sleeve formation extends generally in a longitudinal plane of the link and generally radially of such sleeve formation.

3. The chain defined in claim 2, wherein the slit has respective opposite end portions which extend radially outwardly in the aforesaid plane for a distance then turn obliquely to the edge of each side bar.

4. The chain defined in claim 3, wherein the slit is welded shut solely along the obliquely extending end portions.

5. The chain defined in claim 4, wherein the sleeve's internal wall has a relatively shallow pocket defined therein of an extent transversely of the link occupying the major portion of the length of such internal wall and of a circumferential extent of the order of at least 180°, and a bearing pad of anti-friction material retentively held in said pocket of a thickness to bear on the shaft encircled by such sleeve.

6. The chain defined in claim 5, wherein the pocket and pad have generally parallel opposite ends and sides and the pad material is Teflon (polytetrafluorethylene).

7. The chain defined in claim 1, wherein the sleeve's internal wall has a relatively shallow pocket defined therein of an extent transversely of the link occupying the major portion of the length of such internal wall and of a circumferential extent of the order of at least 180°, and a bearing pad of anti-friction material retentively held in said pocket of a thickness to bear on the shaft encircled by such sleeve.

8. An industrial chain link comprising a pair of longitudinal bars integrally cast with and joined by transverse pivotal link-connecting elements at the respective ends of the bars, one such element comprising a slitted, open-sided sleeve formation bendable into closed generally circular sleeve form to rotatively encompass therein a pivot shaft element of an adjoining link to be connected with said chain link, said sleeve formation including a base portion of semicircular generally cylindrical form and an adjoining arcuately curved cover portion of substantially the same arcuate length as the base portion and curved in the same direction as the base portion but less sharply over at least a portion of its length so as to form a side opening adapted to pass such a shaft.

9. The chain link defined in claim 8, wherein the slit edges have opposite end portions at the sides of the link which, with the sleeve formation bent closed, form recessed pockets to receive weld material.

10. The chain link defined in claim 8, wherein one of the slit edges comprises a face which extends generally in a longitudinal plane of the link and substantially radially in relation to the sleeve in the portion of the latter which lies between the bars.

11. The chain link defined in claim 10, wherein the slit edges with the sleeve bent closed include end portions which extend generally radially a distance in said plane then turn obliquely to the bar edges.

12. The chain link defined in claim 8, wherein the sleeve internal wall has a relatively shallow pocket formation defined therein of an extent transversely of the link occupying the major portion of the length of such internal wall and of a circumferential extent of the order of at least 180°, and a bearing pad of antifriction material retentively held in said pocket of a thickness to bear on a shaft encircled by such sleeve.

13. The method of manufacturing chain from precast one-piece links each including transversely spaced bars integrally joined at respectively opposite ends by pivotal link-connecting elements, an element on one end of one link comprising a pivot shaft and an element on one end of an adjoining link comprising a pivot sleeve formation to rotatively encircle such shaft, said sleeve formation being of slitted open-sided configuration throughout its length initially so as to pass said shaft into said sleeve formation, said method comprising the steps of bending the sleeve formation closed into substantially circular form surrounding the shaft so as to bring the slit edges together, and thereupon welding the split edges shut solely at the sides of the link.

14. A chain link comprising, as an integral casting, at least one transverse open-sided bearing sleeve-forming section having a semicylindrical base portion of substantially circular, concave interior form and an overlying curved cover portion of concave interior form continuing from one edge of the base portion to a free edge separated from the opposite edge of the base portion by a gap of a width which slightly exceeds the interior circle diameter of the base portion, said cover portion being of such configuration and arcuate length, substantially equal to the arcuate length of the base portion, so as to be bendable, by closing of said gap, into substantially circular, cylindrical continuation with the base portion, and side bars formed integrally with the respective ends of said section and extending in generally parallel relationship therefrom.

15. The chain link defined in claim 14, wherein the opposite edge of the base portion lies in a substantially longitudinal plane of the link.

* * * * *